United States Patent [19]
Takeuchi

[11] Patent Number: 5,212,986

[45] Date of Patent: May 25, 1993

[54] SEMICONDUCTOR ACCELERATION SENSOR INCLUDING OFF AXIS ACCELERATION CANCELLATION

[75] Inventor: Takenobu Takeuchi, Itami, Japan

[73] Assignee: Mitsubishi Denki Kabushiki Kaisha, Tokyo, Japan

[21] Appl. No.: 725,473

[22] Filed: Jul. 3, 1991

[30] Foreign Application Priority Data

Nov. 30, 1990 [JP] Japan ................................ 2-330475

[51] Int. Cl.⁵ ............................................. G01P 15/12
[52] U.S. Cl. ...................................... 73/517 R; 338/46
[58] Field of Search ............... 73/517 R, 497, 862.67; 338/2, 5, 46

[56] References Cited

U.S. PATENT DOCUMENTS

| | | | |
|---|---|---|---|
| 3,572,109 | 3/1971 | Yerman | 73/517 R |
| 4,522,072 | 6/1985 | Sulouff et al. | 73/517 R |
| 4,829,822 | 5/1989 | Imai et al. | 73/517 R |

FOREIGN PATENT DOCUMENTS

1000456  8/1965  United Kingdom ............. 73/517 R

*Primary Examiner*—John E. Chapman
*Attorney, Agent, or Firm*—Leydig, Voit & Mayer

[57] ABSTRACT

A semiconductor acceleration sensor has an acceleration sensor element on which gauge resistors are arranged so as to cancel sensed output component corresponding to any acceleration acting in a direction different from an acceleration to be sensed. Consequently, acceleration can be precisely sensed without being influenced by acceleration acting in different

5 Claims, 2 Drawing Sheets

SEMICONDUCTOR ACCELERATION SENSOR INCLUDING OFF AXIS ACCELERATION CANCELLATION

BACKGROUND OF THE INVENTION

1. FIELD OF THE INVENTION

The present invention relates to a semiconductor acceleration sensor and, more particularly, to a semiconductor acceleration sensor which is improved to reduce the influence of acceleration perpendicular to the direction of acceleration to be sensed, thereby enhancing the precision of sensing.

2. DESCRIPTION OF THE RELATED ART

FIG. 3 is a perspective view of a conventional semiconductor acceleration sensor. Referring to this Figure, an acceleration sensor element 1 is partly etched at its reverse side to form a thin-walled diaphragm 2. A plurality of gauge resistors 3a to 3d serving as piezoresistive elements are formed on the upper surface of the diaphragm 2. These gauge resistors have resistance values $R_1$, $R_2$, $R_4$ and $R_3$.

In operation, the diaphragm 2 is deflected in response to acceleration so that the gauge resistors 3a to 3d are stressed to alter electric signals from which the acceleration is determined. In order to enhance the sensitivity, the acceleration sensor is provided with a weight 4. The acceleration sensor element 1 is cantilevered at one end to a base 6 through a pedestal 5.

In the semiconductor acceleration sensor having the described construction, each of the gauge resistors 3a to 3d increases in resistance when pulled in the longitudinal direction and reduces in resistance when tensioned in the direction perpendicular to the longitudinal direction. These gauge resistors 3a to 3d are connected to form a bridge circuit, an equivalent circuit of which is shown in FIG. 4.

Referring to FIG. 3, it is assumed that the acceleration to be sensed acts in the principal direction (Z-axis direction). When another acceleration is applied to the sensor in a direction (X-axis direction or the direction of another axis) perpendicular to the Z-axis direction, stresses are generated in the respective gauge resistors. More specifically, tensile stresses $\sigma_1$ and $\sigma_2$ are generated in the gauge resistors 3a and 3b, respectively, while compressive stresses $-\sigma_4$ and $-\sigma_3$ are generated in the gauge resistors 3c and 3d, respectively. The levels of these stresses meet the following conditions:

$$\sigma_1 > \sigma_2 > -\sigma_4 > -\sigma_3$$

$$\sigma_1 = \sigma_3$$

$$\sigma_2 = \sigma_4$$

Consequently, the resistance values of the gauge resistors 3a to 3d are respectively changed to $R_1 - \Delta R_1$, $R_2 + \Delta R_2$, $R_4 - \Delta R_4$ and $R_3 + \Delta R_3$. Consequently, the equilibrium state of the bridge circuit is broken to develop a potential difference between the terminals $V_{out}\oplus$ and $V_{out}\ominus$. Namely, the following conditions are met.

$$\Delta R_1 = \Delta R_3 = \Delta R_2 = \Delta R_4 = \Delta R'$$

Thus, the potential difference, i.e., voltage, generated between the terminals $V_{out}\oplus$ and $V_{out}\oplus$ is expressed by the following formula.

$(\Delta R - R')/R \times$ (input voltage)

In the semiconductor acceleration sensor having the described embodiment, the sensing output includes a component corresponding to the acceleration acting in a direction (X-axis direction) perpendicular to the principal axis (Z-axis), in addition to the component corresponding to the acceleration to be sensed, i.e., the acceleration acting in the direction of the main axis (Z-axis). It is therefore impossible to sense the acceleration acting in the direction of the principal axis precisely.

SUMMARY OF THE INVENTION

Accordingly, an object of the present invention is to provide a semiconductor acceleration sensor which can reduce the sensing output component corresponding to any acceleration acting in a direction perpendicular to the principal axis, thereby overcoming the above-described problems of the prior art.

To this end, according to one aspect of the present invention, there is provided a semiconductor acceleration sensor comprising: a semiconductor sensor element having a thin-walled portion; a pedestal supporting the semiconductor sensor element; a base on which the pedestal is fixed; a first piezoresistive arranged on a surface of the thin-walled portion of the semiconductor sensor element; and a piezoresistive portion arranged on a surface of the thin-walled portion of the semiconductor sensor element for reducing the level of the sensing output responsive to an acceleration acting in a direction perpendicular both to the direction of the acceleration to be sensed by the semiconductor acceleration sensor and the longitudinal axis of the semiconductor acceleration sensor element.

DESCRIPTION OF THE PREFERRED EMBODIMENTS

Figure 1:
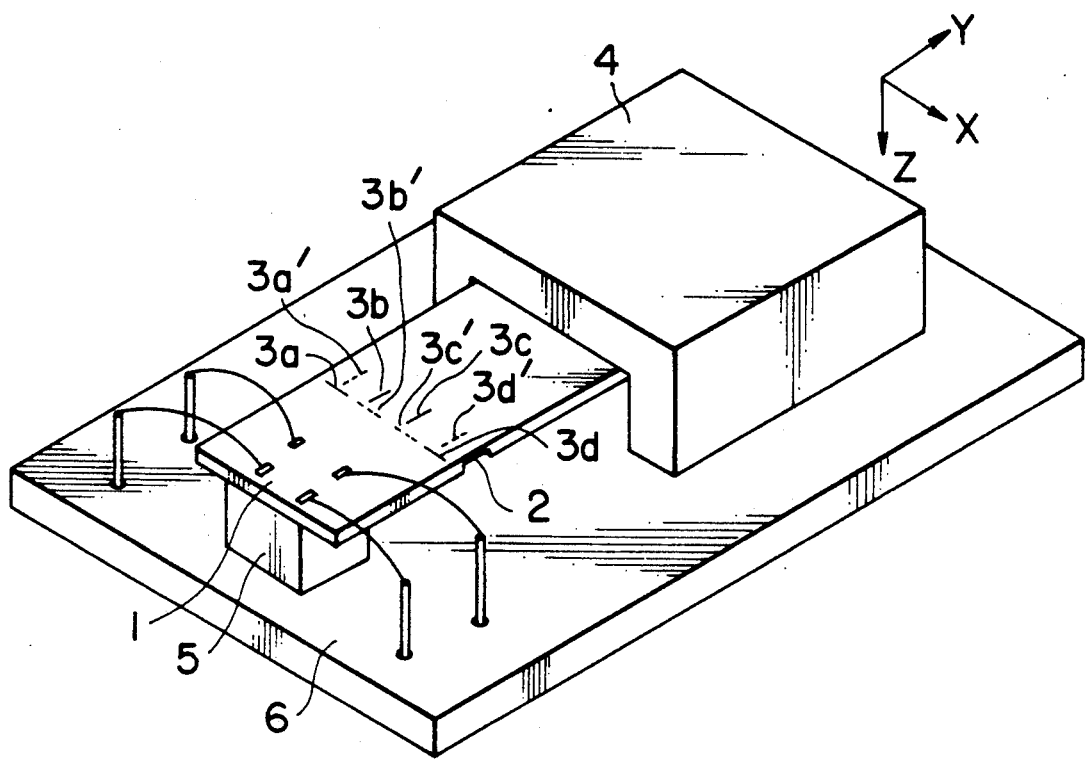
FIG. 1 is a perspective view of a semiconductor acceleration sensor in accordance with an embodiment of the present invention.

FIG. 1 is a perspective view of a semiconductor acceleration sensor in accordance with the present invention.

Figure 3:
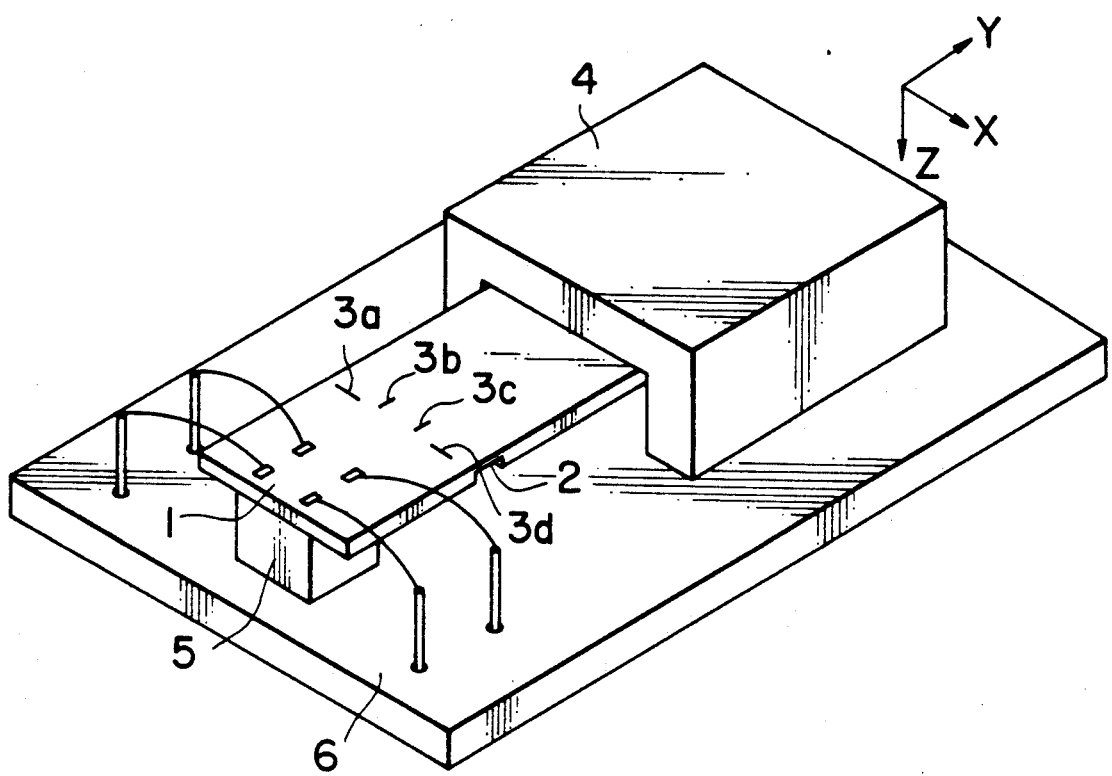
FIG. 3 is a perspective view of a conventional semiconductor acceleration sensor.
Figure 4:
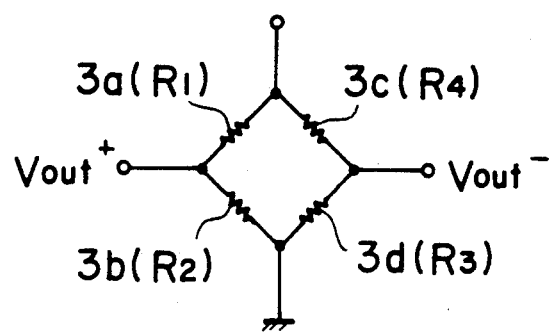
FIG. 4 is a diagram of a circuit equivalent to the internal circuit of the acceleration sensor shown in FIG. 3.

Referring to this Figure, a semiconductor acceleration sensor embodying the present invention has an acceleration sensor element 1 with a diaphragm 2, gauge resistors 3a to 3d, a weight 4 and a pedestal 5 which are materially the same as those in the known semiconductor sensor device explained before in connection with FIGS. 3 and 4.

Figure 2:
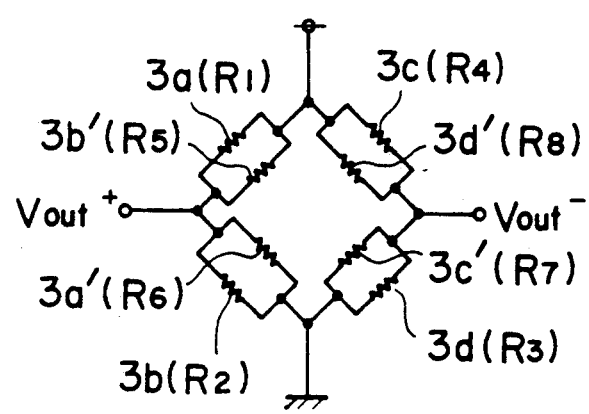
FIG. 2 is a diagram of a circuit which is equivalent to the internal circuit of the acceleration sensor shown in FIG. 1.

The semiconductor acceleration sensor of FIG. 1 has, in addition to the gauge resistors 3a to 3d as the first piezoresistive elements, gauge resistors 3a' to 3d' which are disposed on the obverse side of the diaphragm 2 and which serve as second piezoresistive elements. The gauge resistors 3a' to 3d' are connected so as to form an internal circuit an equivalent circuit of which is shown in FIG. 2. The gauge resistors $3a'$ to $3d''$ have resistance values $R_6$, $R_5$, $R_7$ and $R_8$.

In this semiconductor acceleration sensor, stresses are generated in the respective gauge resistors as follows, in response to an acceleration acting in an X-axis direction which is perpendicular to the direction (Z-axis) of the acceleration which is to be sensed:

tensile stress $\sigma_1$ in gauge resistors $3a$ and $3a'$
tensile stress $\sigma_2$ in gauge resistors $3b$ and $3b'$
compressive stress $-\sigma_4$ in gauge resistors $3c$ and $3c'$
compressive stress $-\sigma_3$ in gauge resistors $3d$ and $3d'$ The resistance values R1 to R8 are determined to be the same and expressed by R.

The gauge resistors $3a$ to $3d'$ are arranged such that the stress values $\sigma_1$ and $\sigma_3$ are equal to each other and such that the stress value $\sigma_2$ and $\sigma_4$ are equal to each other. Namely, the gauge resistors $3a$ and $3a'$ are arranged orthogonally to each other. Similarly, orthogonal positional relationships are provided between the corresponding gauge resistors on both sides of the sensor element 1, i.e., between the gauge resistors $3b$ and $b'$, between the gauge resistors $3c$ and $3c'$ and between the gauge resistors $3d$ and $3d'$. In addition, the gauge resistors $3b$ and $3a'$ are positioned such that the distance between the gauge resistor $3b$ and the center of the diaphragm is, for example, ½ the distance of the gauge resistor $3a'$ from the center of the obverse side of the diaphragm 2. Similarly, the gauge resistors $3c$ and $3d'$ are located at the same distance ratio 1:2 from the center of the obverse side of the diaphragm 2. Representing the variance of the resistance value $R_1$ by $2\Delta R$, the resistance values of the respective gauge resistors are given as follows:

$R_1 = R - 2\Delta R$
$R_2 = R + \Delta R$
$R_3 = R + 2\Delta R$
$R_4 = R - \Delta R$
$R_5 = R - \Delta R$
$R_6 = R + 2\Delta R$
$R_7 = R + \Delta R$
$R_8 = R - 2\Delta R$ Consequently, OV is obtained as the output of the bridge circuit. This means that the sensing output from the acceleration sensor does not include any component corresponding to the acceleration acting in the X-axis direction. Consequently, the acceleration in the Z-axis direction is sensed with a high degree of accuracy without being affected by any acceleration acting in the X-axis direction.

What is claimed is:

1. A semiconductor acceleration sensor comprising:
   a semiconductor acceleration sensor element having a longitudinal axis, said acceleration sensor for sensing acceleration in a particular direction perpendicular to the longitudinal axis, said semiconductor acceleration sensor element having a thin-walled portion including opposed first and second surfaces;
   first piezoresistive sensing means disposed on the first surface of the thin-walled portion of said semiconductor acceleration sensor element changing in resistance in response to acceleration of said semiconductor acceleration sensor element, said first pieroresistive sensing means including first pierzoresistive elements for sensing acceleration of said semiconductor acceleration sensor element in the particular direction and second piezoresistive elements for sensing acceleration of said semiconductor acceleration sensor element in a direction perpendicular to the particular direction; and
   second piezoresistive sensing means disposed on the second surface of the thin-walled portion of said semiconductor acceleration sensor element changing in resistance in response to acceleration of said semiconductor acceleration sensor element, said second piezoresistive sensing means including third piezoresistive elements for sensing acceleration of said semiconductor acceleration sensor element in the particular direction and fourth pierzoresistive elements for sensing acceleration of said semiconductor acceleration sensor element in a direction perpendicular to the particular direction, wherein said first, second, third, and fourth piezoresistive elements are interconnected in a bridge circuit for cancelling changes in resistance of said first and second piezoresistive sensing means in response to an acceleration acting on said semiconductor acceleration sensor element in a direction perpendicular to the particular direction.

2. The semiconductor acceleration sensor according to claim 1 wherein each of said piezoresistive element is a resistor.

3. The semiconductor acceleration sensor according to claim 2 wherein each of said gauge resistors of said first piezoresistive sensing means is orthogonal to one of said gauge resistors of said second piezoresistive sensing means.

4. The semiconductor acceleration sensor according to claim 3 wherein said first piezoresistive sensing means includes four gauge resistors, two of said gauge resistors of said first piezoresistive sensing means being orthogonal to two other gauge resistors of said first piezoresistive sensing means.

5. The semiconductor acceleration sensor according to claim 4 wherein said second piezoresistive sensing means includes four gauge resistors, two of said gauge resistors of said second piezoresistive sensing means being orthogonal to two other gauge resistors of said second piezoresistive sensing means.

* * * * *

UNITED STATES PATENT AND TRADEMARK OFFICE
CERTIFICATE OF CORRECTION

PATENT NO. : 5,212,986

DATED : May 25, 1993

INVENTOR(S) : Takenobu Takeuchi

It is certified that error appears in the above-identified patent and that said Letters Patent is hereby corrected as shown below:

Title page, col. 2, item [57] Abstract, line 3, change "component" to components--;

line 6, change "acceleration" to --accelerations--;

line 7, after "different" insert --directions--.

Claim 2, col. 4, line 37, after "a" insert --gauge---.

Signed and Sealed this

Eleventh Day of January, 1994

Attest:

*Attesting Officer*

BRUCE LEHMAN

*Commissioner of Patents and Trademarks*